(12) United States Patent
Statham et al.

(10) Patent No.: US 7,266,192 B2
(45) Date of Patent: *Sep. 4, 2007

(54) RETRIEVAL OF DATA RELATED TO A CALL CENTER

(75) Inventors: Steven W. Statham, Monument, CO (US); Ronald A. Medo, Monument, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/296,381

(22) Filed: Dec. 8, 2005

(65) Prior Publication Data

US 2006/0147026 A1    Jul. 6, 2006

Related U.S. Application Data

(63) Continuation of application No. 10/882,657, filed on Jul. 2, 2004, now Pat. No. 7,065,202, which is a continuation of application No. 09/983,293, filed on Oct. 23, 2001, now Pat. No. 6,868,152.

(60) Provisional application No. 60/242,627, filed on Oct. 23, 2000.

(51) Int. Cl.
*H04M 3/523* (2006.01)
*H04M 7/00* (2006.01)
*H04M 15/00* (2006.01)

(52) U.S. Cl. ............... 379/265.02; 379/112.06; 379/136; 379/220.01; 379/265.03

(58) Field of Classification Search ............... 379/111, 379/112.01, 112.06, 112.09, 133, 134, 136, 379/219, 220.01, 265.01–265.08, 266.04, 379/266.05

See application file for complete search history.

(56) References Cited

U.S. PATENT DOCUMENTS

| | | | |
|---|---|---|---|
| 4,737,983 A | 4/1988 | Frauenthal et al. | |
| 5,136,690 A | 8/1992 | Becker et al. | |
| 5,270,919 A | 12/1993 | Blake et al. | |
| 5,291,550 A | 3/1994 | Levy et al. | |
| 5,335,268 A | 8/1994 | Kelly et al. | |
| 5,450,482 A | 9/1995 | Chen et al. | |
| 5,452,350 A | 9/1995 | Reynolds et al. | |
| 5,511,117 A | 4/1996 | Zazzera | |
| 5,530,744 A | 6/1996 | Charalambous et al. | |
| 5,734,709 A | 3/1998 | DeWitt et al. | |
| 5,812,654 A | 9/1998 | Anderson et al. | |
| 5,917,900 A | 6/1999 | Allison et al. | |
| 5,946,387 A | 8/1999 | Miloslavsky | |
| 6,134,315 A | 10/2000 | Galvin | |
| 6,404,883 B1 | 6/2002 | Hartmeier | |
| 6,868,152 B2 | 3/2005 | Statham et al. | |
| 7,065,202 B2 * | 6/2006 | Statham et al. | 379/265.02 |

* cited by examiner

*Primary Examiner*—Harry S. Hong

(57) ABSTRACT

In recent times, communications service providers have been able to offer large business enterprises the ability to share call center operation among multiple geographically dispersed call centers. In particular, network-resident call handling technologies have been developed for performing some of the handling and queuing of each inbound call within the communications network, that is, before the call is forwarded to an ACD at a particular call center. However, by outsourcing a portion of the call center operations to a network-based call routing system, the call centers are no longer able to maintain direct control over, and are generally unable to directly access information, such as statistics, about the calls in the network or other call centers. Accordingly, an interface is provided that allows an entity to obtain information about calls within the network or other call center(s).

28 Claims, 8 Drawing Sheets

RETRIEVAL OF DATA RELATED TO A CALL CENTER

RELATED APPLICATION DATA

This application is a continuation of U.S. patent application Ser. No. 10/882,657, filed Jul. 2, 2004 now U.S. Pat. No. 7,065,202, which is a continuation of U.S. patent application Ser. No. 09/983,293, filed Oct. 23, 2001, now U.S. Pat. No. 6,868,152, which claims the benefit of and priority to U.S. Application Ser. No. 60/242,627, filed Oct. 23, 2000, entitled "Real-time data feed for a call center," and is related to U.S. Pat. No. 5,917,900, entitled "Remote Data Gateway," all of which are incorporated herein by reference in their entirety.

BACKGROUND OF THE INVENTION

1. Field of the Invention

The present invention generally relates to providing information, such as workload statistics and resource utilization, about calls within a communications network and, more particularly, to providing real-time information pertaining to the operation of call centers.

2. Description of Related Art

A typical call center houses a number of agents who handle incoming telephone calls or place outbound telephone calls. Call centers are often used for telemarketing, reservation centers, sales calls, customer services, technical support, and the like.

Each agent in a call center has an associated station that typically includes a personal computer or workstation, a phone keypad and a headset. The workstation is most often used to access information in a database pertaining to the calls being handled by the agent. For example, the workstation may provide views of account information or contact information pertaining to a customer whom the agent engages on the phone. Where a call center is used for accepting orders for goods or services, the workstation may provide information on the availability and the pricing of a product. The agent may use the information retrieved from the database to help a caller. The agent may accept information from a caller for entry into the database.

In addition to a database shared by the agents, a call center typically comprises an automatic call distributor (ACD) for channeling or routing calls to available agents.

In large call centers, the agents are often organized into groups and have associated supervisors who are responsible for managing and overseeing the agents. To assist in effective management of call center resources, supervisors are usually provided with real-time statistics pertaining to the operation of the call center, such as the number of calls on hold, wait times being experienced, and the number of abandoned calls. These statistics may be obtained indirectly from the ACD. Other useful statistics, such as the number of agents on duty, may be obtained from the network or agent workstations, wherein the agents "check-in" whenever they are on duty.

In recent times, communications service providers have been able to offer large business enterprises the ability to share call center operations among multiple geographically dispersed call centers. In particular, network-resident call handling technologies, such as intelligent network services platforms, have been developed for performing some of the handling and queuing of each inbound call within the communications network, that is, before the call is forwarded to an ACD at a particular call center. This is advantageous for allowing load balancing among multiple call centers and enabling agent-based or skills-based routing across multiple call centers. Furthermore, the initial automatic voice response activity that greets the caller and the parking of calls becomes the responsibility of the communications network provider, relieving a business enterprise of many of the costs and other burdens associated with running a complete, self-contained call handling system.

SUMMARY

With the handling and queuing of inbound calls being performed in a network, a supervisor at a particular call center no longer has visibility to the statistics about inbound calls parked in the network waiting to be answered by the call center. Thus, a need arises for a call center supervisor to obtain real-time statistics including information about calls that have not yet been forwarded to the call center. Furthermore, where an enterprise operates multiple call center locations, the supervisor may need to see statistics, such as agent availability, applicable to multiple call center locations.

Accordingly, and in accordance with an exemplary embodiment of this invention, an interface is provided that allows a user to obtain information about calls within one or more intelligent network services platforms. Additionally, in accordance with another exemplary embodiment, an interface is provided that allows a user to obtain information about calls within one or more intelligent network services platforms and one or more call centers.

To obtain information about calls within a network, such as an intelligent network services platform that at least manages call routing to one or more call centers, an entity, module, user, or the like, generally at a call center, initiates a statistics request that is translated to an appropriate format and forwarded to a statistics collector. The statistics collector communicates with a statistics server, which may or may not be collocated with the call center, to retrieve the requested information. The statistics server then forwards the requested information back to the statistics collector that, in cooperation with a distributor, translates and maps the requested information into a predetermined format and returns the statistics to the requester. The requester can then manipulate and/or convert the data into an appropriate display format, such as a display format compatible with a wallboard system.

Thus, an exemplary feature of this arrangement is that a call center can obtain data about calls within an intelligent network services platform, without actually obtaining direct access to the intelligent network services platform itself. Furthermore, the intelligent network services platform administrators are able to control, for example, how often the data in their system can be accessed, what type of data can be accessed, appropriate billing and/or other desirable aspects of the data providing service.

Aspects of the present invention relate to obtaining network data. In particular, information about calls within one or more of a call center and a telecommunications network can be obtained by a requester.

Aspects of the present invention also relate to systems and method for facilitating the extraction of data from one or more intelligent network services platforms and/or call centers.

Aspects of the present invention also relate to systems and methods for communicating information between one or more intelligent network services platforms and one or more call centers.

Aspects of the present invention also relate to translating data from a first format, received from an intelligent network services platform, to a second format, for display at a call center.

Aspects of the present invention also relate to a system and method for requesting information from a network, such as an intelligent network services telecommunications platform.

Aspects of the present invention additionally relate to the general systems and components necessary, and data flow between, an intelligent network services platform that manages incoming calls, and a call center, such as one or more call centers or virtual call centers, that desire information from the intelligent network services platform.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION

Figure 1:
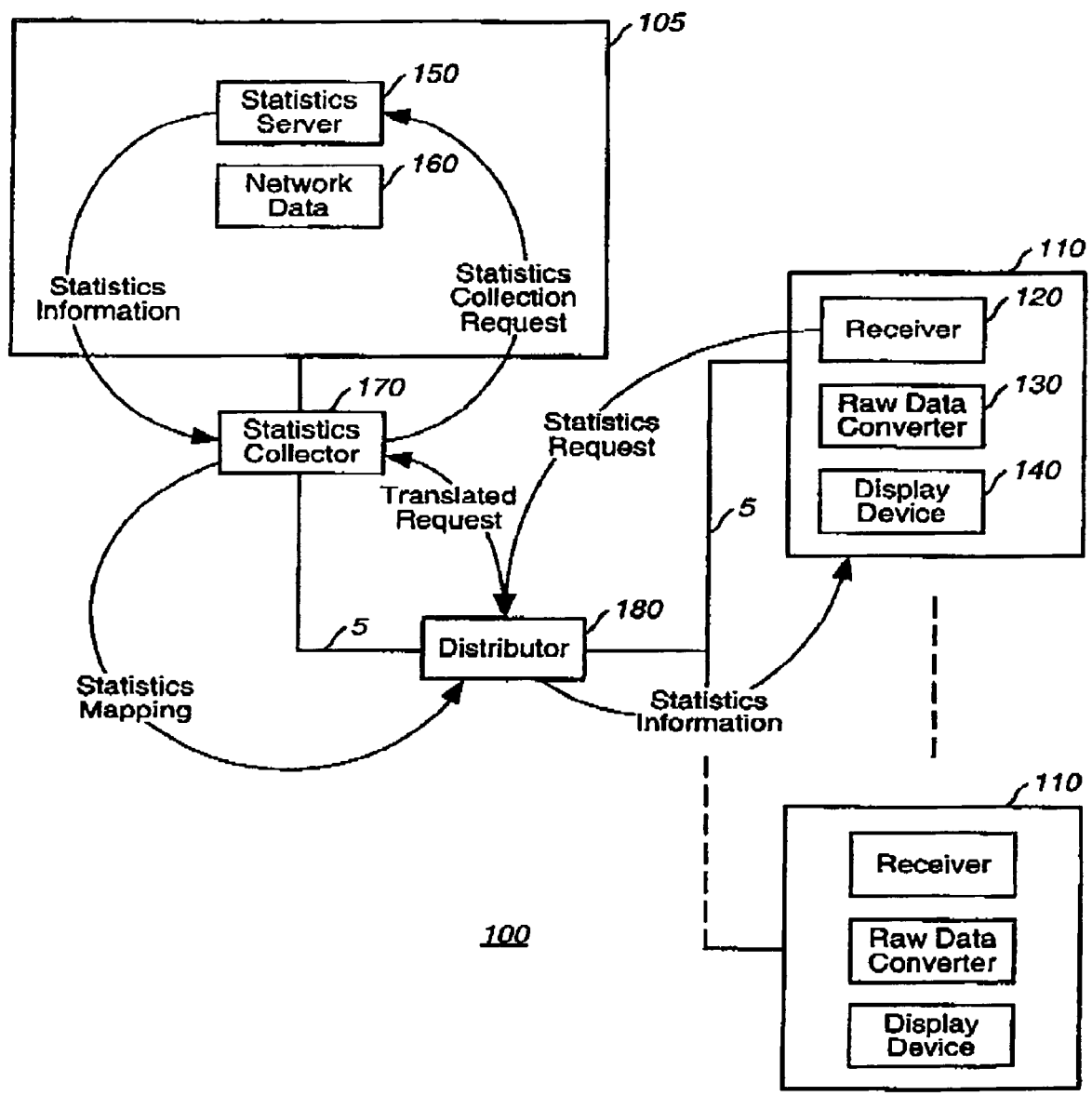
FIG. 1 is a simplified functional block diagram illustrating an exemplary telecommunication network system according to this invention.

The exemplary systems and methods of this invention allow a user to secure information about calls in an intelligent network services platform. In particular, and in accordance with an exemplary embodiment of this invention, a user requests statistical information via a distributor. The distributor translates the request and forwards the translated request to a statistics collector. The statistics collector initiates a query to obtain the requested statistics from the statistics server. The statistics server returns the requested statistical information to the statistics collector. Upon receipt of the requested statistical information, the statistics collector returns the requested information to the distributor which appropriately maps and/or translates the information into, for example, a format specified by the request. This information is then returned to the users location where, for example, the data can be converted into a predetermined format suitable for display.

This type of configuration allows the user to, for example, obtain real-time or near real-time information about calls within an intelligent network services platform. Alternatively, the request can be configured to obtain historical information about calls that have been processed by the intelligent network services platform or a combination of calls currently being processed as well as historical information. Alternatively still, information about one or more intelligent network services platforms and/or one or more other collocated, non-collocated or virtual call centers can be requested by the user.

While the exemplary embodiments illustrated herein show various components of the intelligent network services platform and call center(s) collocated, it is to be appreciated that the various components of the intelligent network services platform and call center(s) can be located at distant portions of a distributed network, such as a local area network, a wide area network, a telecommunications network, an intranet and/or the Internet, or within a dedicated intelligent network services platform and associated call center(s). Thus, it should be appreciated that the components of the intelligent network services platform and call center(s) can be combined into one or more devices or collocated on a particular node of a distributed network. As will be appreciated from the following description, and for reason of computational efficiency, the components of the intelligent network services platform and call center(s) can be arranged at any location within a distributed network without affecting the operation of the system. For example, the functions of the distributor and collector can be combined.

Furthermore, it should be appreciated that the various links connecting the elements can be wired or wireless links, or combination thereof, or any known or later developed element(s) that are capable of supplying and/or communicating data to and from the connected elements.

Generally speaking, and in accordance with an exemplary embodiment of this invention, an interface is provided that supports real-time data feeds such that users can access telecommunications network statistics. This data feed allows, for example, statistics generated by a first party's network to be available at a second party, such as a call center. The data feed allows all or a portion of the statistics available at a statistics server to be available, with the cooperation of a statistics receiver at, for example, a call center or virtual call center with multiple geographically diverse groups. The configuration of the system allows for full scalability, including a backup and redundancy scheme that allows for continuous operation should a portion of the system fail.

The statistics collection process involves a combination of a statistics collector process and a distributor process. In addition, a receiver process that is located, for example, at a call center receives and processes the information received from the distributor. The receiver is responsible for statistics selection, via configuration variables and parameters that identify the required statistics, and for initiating the information request based on a request time interval. To initiate a request, the receiver communicates the desired information to the distributor and awaits a reply. The distributor is capable of interfacing with one or more receivers and matches or maps a receiver statistic request with the available statistics collector information. The statistics collector interfaces with the statistics server to obtain receiver requested statistics or other requested information.

FIG. 1 illustrates a first exemplary embodiment of the telecommunications and data network 100. In particular, the network 100 comprises one or more call centers 110, an intelligent network services platform 105, a statistics collector 170 and a distributor 180, all interconnected by links 5. The call center 110 comprises a receiver 120, a raw data converter 130 and a display device 140. The intelligent network services platform 105 comprises, along with other components that are well known to one of ordinary skill in the art, a statistics server 150 and network data 160.

In operation, a statistics request originates at the receiver 120. The statistics request can be initiated by a user who, for example, enters information via an input device (not shown) such as, for example, a graphical user interface residing on one or more of an agent's and/or supervisor's workstation, or comparable interface that receives information and assembles a statistics request. Alternatively, the receiver can maintain a plurality of stored statistics requests that can be invoked automatically, for example, at a predetermined time frame, on the occurrence of an event, or manually, for example, upon a user's specific request.

The assembled statistics request is then transmitted, via link 5, to the distributor 180. The distributor 180 translates the request into a format that is compatible with the particular intelligent network services platform 105 to which the statistics request is directed. For example, in an embodiment where there are a plurality of call centers 110 and a plurality of intelligent network services platforms 105, the distributor 180 can manage the translation of the statistics request to ensure that the statistics request is compatible with, and the statistics are available from, the particular intelligent network services platform 105 to which the request is directed. If the distributor 180 determines that the particular set of statistics are available based on the statistics request, the translated statistics request is forwarded to the statistics collector 170. However, if the requested statistics are not available, a message can optionally be returned to the call center 110 prompting the user for clarification or resubmission of another statistics request.

This statistics collector 170, in cooperation with the statistics server 150 and the data network 160, performs the statistics collection based on the translated request. The statistics server 150 then forwards the collected statistics information to the statistics collector 170. The statistics collector returns the information to the distributor 180 which maps, or translates, the statistics information to, for example, a predetermined format or other format that can be based on, for example, a format specified in the request. This translated information is then forwarded back to the call center 110, and specifically the raw data converter 130, that converts the received data into one or more predetermined display format(s). The data can then be displayed via the display device 140, such as a wallboard, agent and/or supervisor workstation, or the like.

In accordance with this exemplary embodiment, the statistics collector 170 would be managed by the particular intelligent network services platform 105 with which it is associated. In this manner, the intelligent network services platform 105 can regulate the frequency and sophistication of data mining that can occur on the network data 160. However, it is to be appreciated that the statistics collector 170 need not be managed by the intelligent network services platform, but can rather be managed by any entity(s).

For example, the distributor 180 manages the statistics that are valid for a particular intelligent network services platform. Furthermore, the distributor 180 manages the parameters that are available for the valid statistics. Examples of these statistical parameters, which can be set as either as required or optional, are as follows. Specifically, a data sample rate, for example in seconds, specifies when the one or more statistics are to be sampled. For example, common values for the data sample rate are 5, 10, 15 or 20 seconds. The expected answer time (EAT), which a call center establishes as an expected response time threshold within which incoming calls should be answered, can be used for filtering statistics, for example, excluding the calls which have been answered within the EAT threshold. Another exemplary statistical parameter is a sliding time window. The sliding time window specifies, based upon a predetermined time, how often accumulating totals should be generated for the network data. This can be used for statistics that will be needed to be totaled over a predetermined period of time. For example, if the sliding time window is 600 seconds, which is used in combination with a data sample rate of 5 seconds, a new total would be presented every 5 seconds of the last 10 minutes worth of data. Alternatively, an indicator can be specified if the statistic is to be collected as a growing accumulation or as a snapshot of the current value. Furthermore, the statistics can be divided, subdivided and grouped into, for example, categories and levels that include, for example, names of each statistic and a customer identification.

The statistics server 150, in conjunction with the network data 160, maintains and accumulates the statistical information about the network data. This allows statistical information to continue to be collected even if there is a failure that occurs with the data flow between the call center and the user. Furthermore, the remaining portions of the system, such as the statistics collector 170 and the distributor 180, can be configured such that in the event of a failure, the various system components will attempt to reconnect to the various other components and resume outstanding or unsatisfied queries where the process left off.

Figure 2:
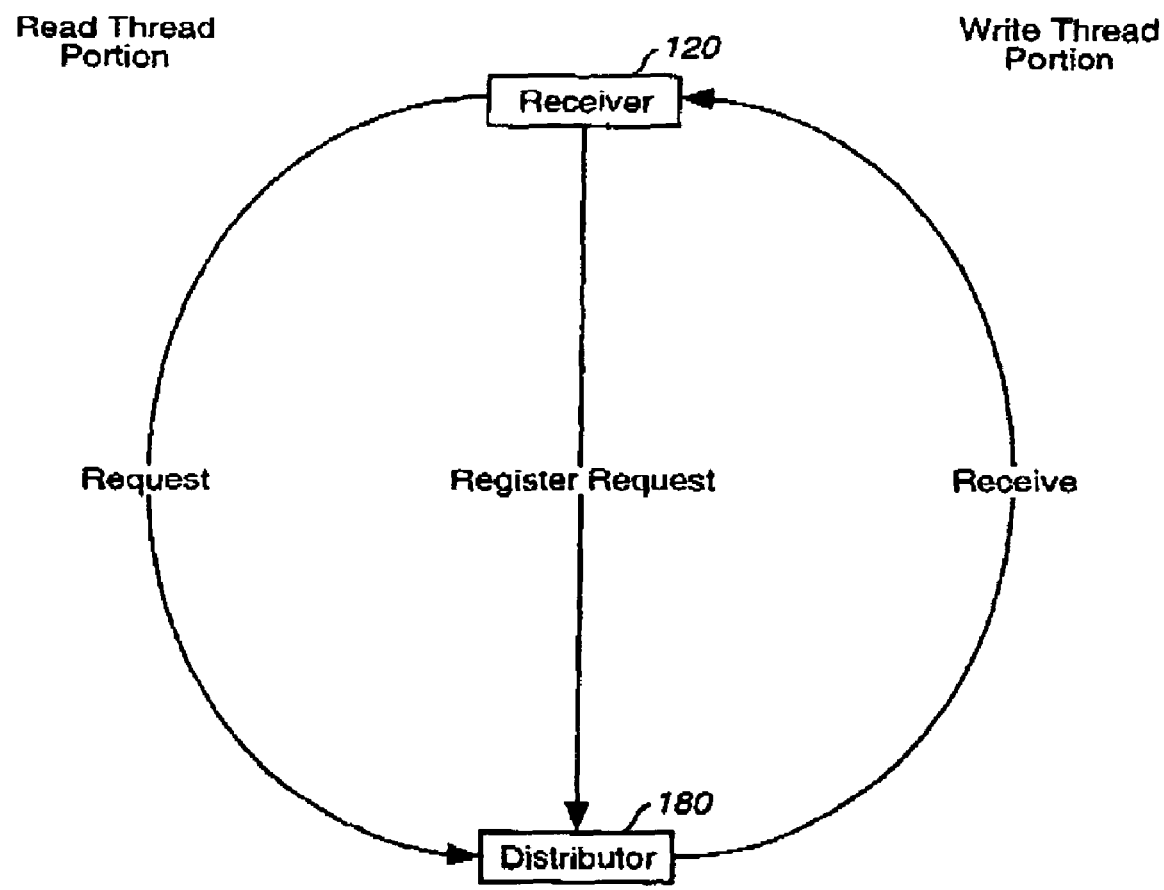
FIG. 2 is a block diagram illustrating an exemplary method of exchanging information according to this invention.

FIG. 2 illustrates an exemplary method of the data flow between the receiver 120 and the distributor 180. The receiver 120 will commonly perform the following functions. First, the receiver will register with the distributor by sending a data registration request to the distributor 180. Next, the receiver 120 will forward a request to the distributor. Then, the receiver 120 will receive data from the distributor 180 via, for example, a write thread.

For example, the receiver can be a multi-threaded design where one thread will block on a TCP/IP socket write file descriptor waiting for new data structures from the distributor, while the other thread will handle the transmission of new registration and deregistration requests.

For example, if the process is data collection, one thread can block on a TCP/IP socket read file descriptor waiting for new data registration and deregistration request from the distributor, while the other thread will handle, for example, advertising the availability of additional data items as well as the transmission of data. If the process is data reception, one thread can block on a TCP/IP socket read file descriptor waiting for new data structure from the distributor, while the other thread will handle the transmission of a new registration and deregistration request.

Figure 3:
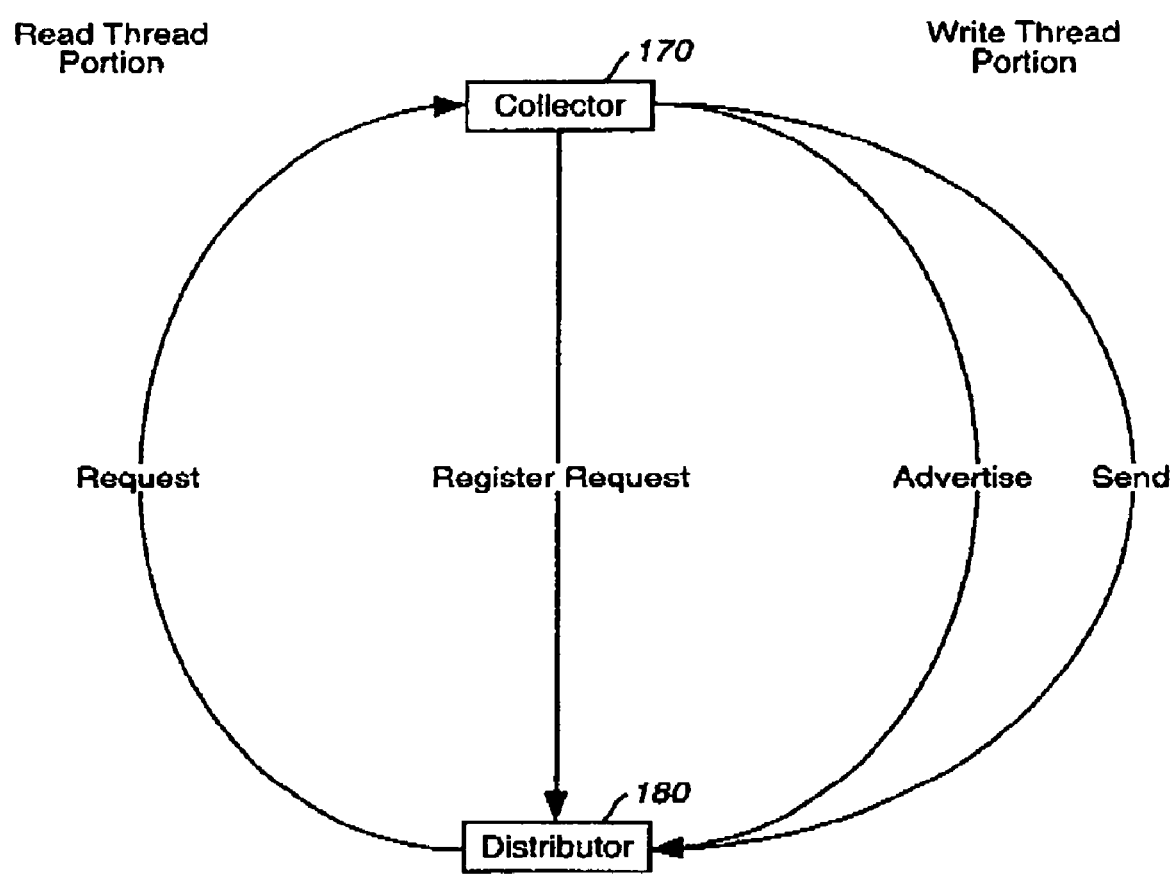
FIG. 3 is a block diagram illustrating a second exemplary method of exchanging information according to this invention.

FIG. 3 illustrates an exemplary embodiment of communication between the collector 170 and the distributor 180. In particular, upon initialization, the collector 170 will register with the distributor 180 via, for example, a TCP/IP client-server socket API. However, one of ordinary skill in the art would appreciate that alternatively the distributor could register with the collector. The distributor 180 will start two threads for data communication for each client process. In particular, the sequence of communication between the collector 170 and the distributor 180 are as follows. First, the collector registers with the distributor 180. Next, a write thread will be initiated between the collector 170 and the distributor, and then a read thread request will be initiated between the distributor 180 and the collector 170. Finally, a send thread is established between the collector 170 and the distributor 180.

For example, the distributor 180 can comprise a memory (not shown) that stores a list of all client collector and receiver processes, advertised collector data specifics and receiver data registration requests. These list can, for example, be matched to ensure that all data registration requests are supported and not duplicated.

Figure 4:
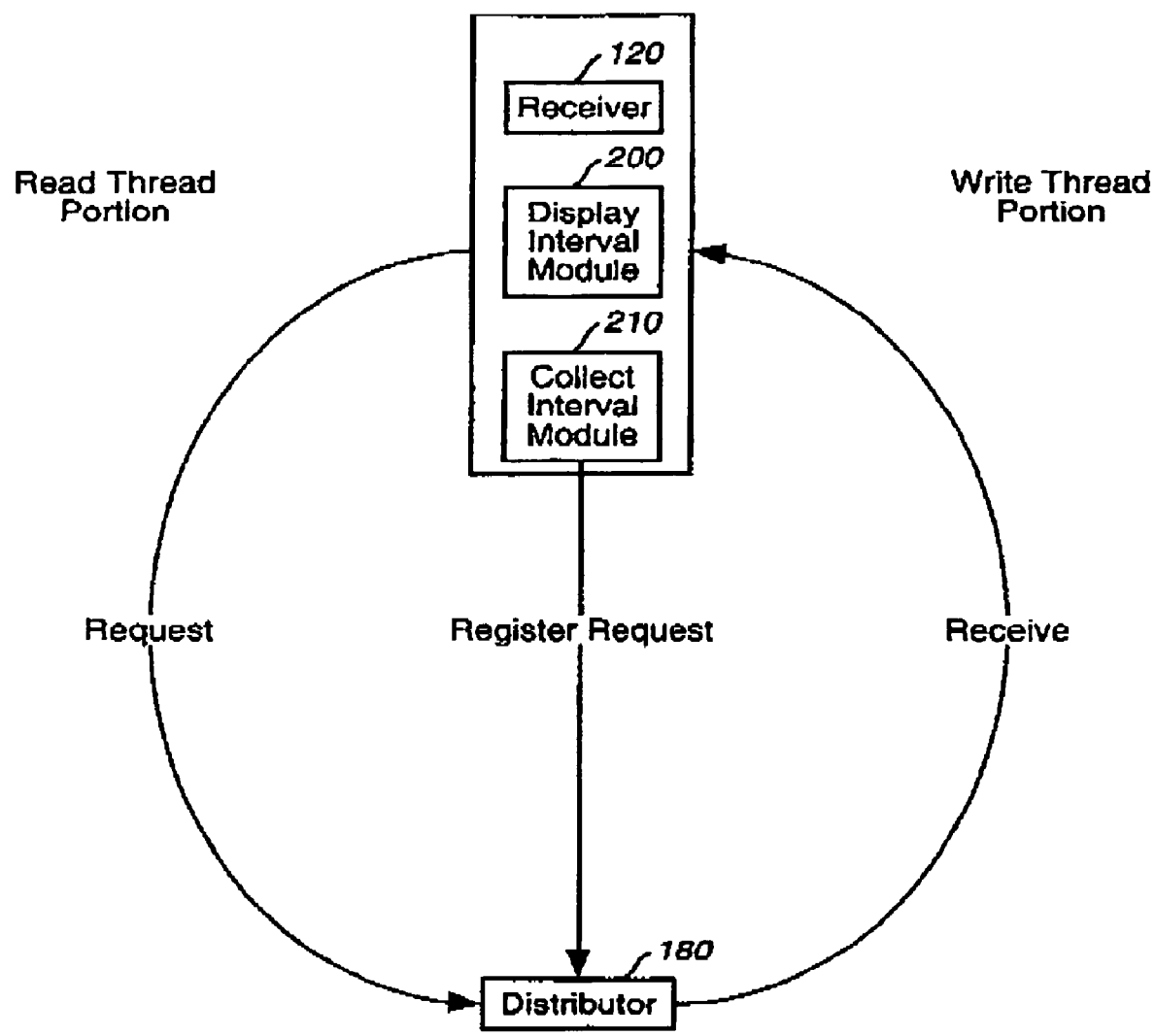
FIG. 4 is a block diagram illustrating a third exemplary method of exchanging information according to this invention.

FIG. 4 illustrates an exemplary embodiment of the communication between the receiver 120 and the distributor 180 that includes a display interval module 200 and a collect interval module 210. As previously discussed, the receiver, in conjunction with the data converter 130, formats and manipulates data for display on, for example, a wallboard. Additionally, the receiver 120, in conjunction with the display interval module 200 and the collect interval module 210, can manage both the collection and the display of information, such as statistical information from a intelligent network services platform 105. For example, data can be collected in predetermined intervals, such as 5 second intervals, but be scheduled to be updated and/or displayed on the display device 140 in, for example, 5, 10, 15 and/or 20 second intervals. Thus, the receiver 120, in cooperation with the collect interval module 210 communicates with both the distributor 180 and the statistics collector 170 to register requests and receive statistics.

In general, the user can request any information, such as real-time, near-real time or historical statistics, that are available in the intelligent network services platform 105. Examples of commonly requested statistics that can be collected for subsequent display include, but are not limited to the following.

Parked calls—a snapshot of the number of calls currently in a parked state in the call center.

Calls abandoned while parked—this statistic reflects the number of hang-ups that occur while a call is parked. This statistic can be based on, for example, a sliding window accumulation, a cumulative total, and can further include filters, that, for example, exclude call statistics that do not meet a certain parameter such as EAT.

Maximum distribution time—a snapshot of the duration of the longest currently parked call.

Current number of agents logged in—a snapshot of the number agents logged in to the automatic call distribution system.

Current number of agents not ready—a snapshot of the number agents not ready to take calls.

Service levels—a cumulative statistic representing a percentage of the calls that were answered against the number of calls that could have been answered. This statistic can have an associated EAT with a predefined time interval that includes, for example, an EAT associated with a predetermined time interval based on calls parked greater than the EAT and calls abandoned greater than the EAT in the determination period.

Total number of calls distributed—a cumulative number of calls answered by agents for the day or some other predetermined time period. This statistic can be reset at the end of the predetermined time period.

The current number of agents on call—a snapshot of number of agents currently on call.

Current number of agents in works—a snapshot of the number of agents not accepting calls due their unavailability while performing call follow-up tasks.

Gateway routing request—an accumulative statistic using the calculation of the service level. This represents the number of calls coming into the network route point.

Figure 5:
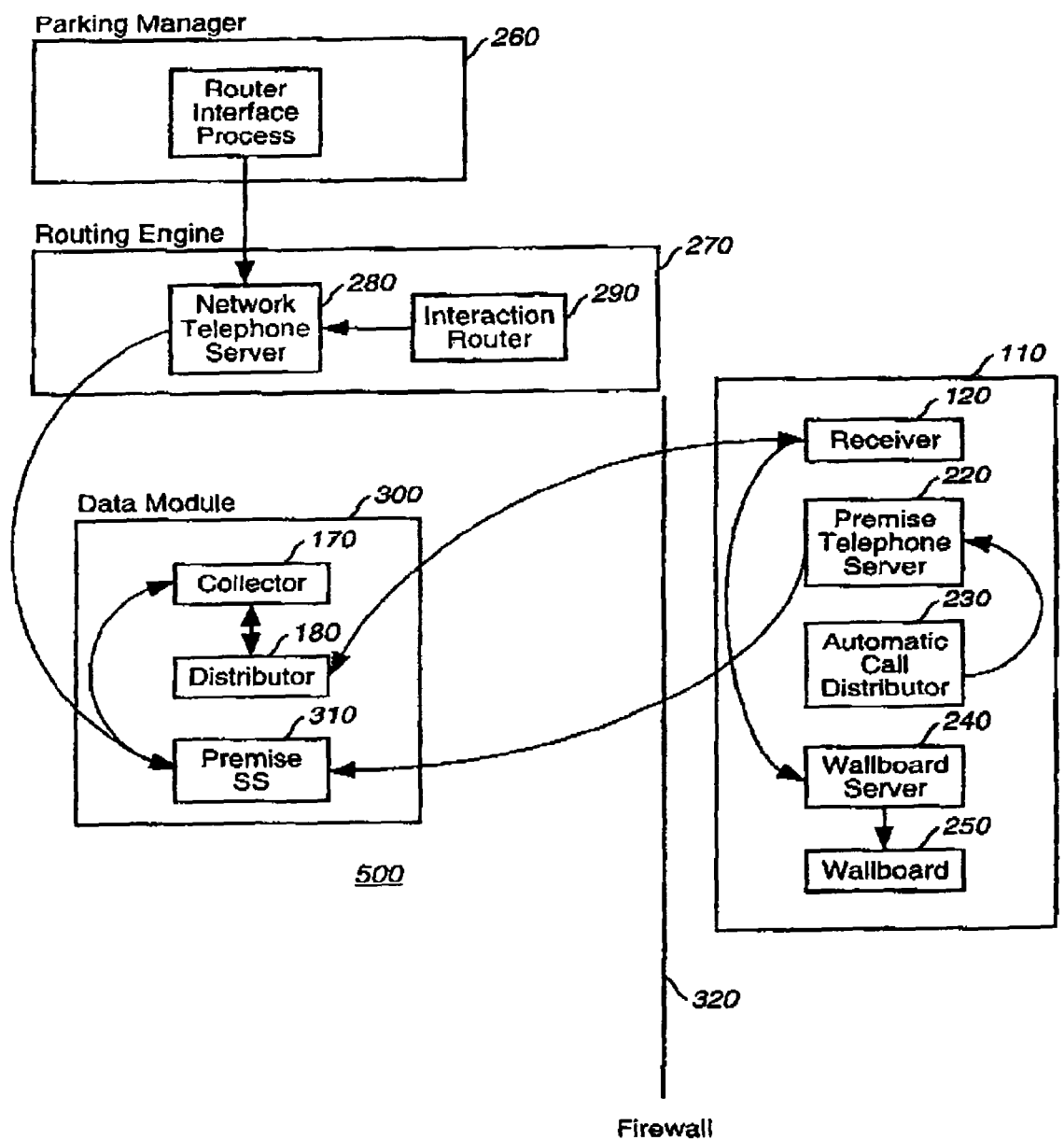
FIG. 5 is a simplified functional block diagram illustrating a second embodiment of the telecommunication network system according to this invention.

FIG. 5 illustrates a second exemplary embodiment of a telecommunications network 500. The telecommunications network 500 comprises one or more call centers 110, a parking manager 260, a routing engine 270, a data service module 300 and an optional firewall 320. The parking manager 260 comprises a router interface process that sends events based on, for example, parking statistics to the network telephone service 280. The parking statistics, as discussed above, can be statistics such as calls abandoned while parked and calls parked.

The routing engine 270 comprises a network telephone server 280 and an intelligent router 290. The network telephone server 280 cooperates with the premises statistics server 310 to generate statistics about a call within the call center based on, for example, the user and dialed number. The interaction router 290 receives calls from a data access point and/or a remote data gateway, discussed hereinafter, by way of a routing telephone server (not shown) and determines, based upon a table, how to route calls within the data exchange system 500.

The data module 300 comprises the collector 170, which can operate in real-time or near real-time. The collector can communicate and cooperate with both the network telephone server 280 and the premises telephone server 220 to collect a predefined set of statistics at predetermined time intervals, via the premises statistics server 310. The collector 170 also communicates and exchanges information with the distributor 180 to ensure the distributor 180 is aware of what statistics are available. Thus, upon a statistics request, the collector 170 receives the statistics request from the distributor 180. The collector 170 then collects the statistics from the statistics server 310 based at least on the request from the distributor 180, and optionally on information located in a configuration management environment. For example, the configuration management environment can further govern the operation of the collector 170 based on information other than that explicitly requested by the distributor 180. Thus, the configuration management environment can be, for example, a mechanism, application or the like, by which operators can set and/or configure settings that control how the collector operates. Then, the collector 170 forwards the requested statistics to the distributor 180 at the specified intervals. Since it is possible that certain statistics names within these statistics server 310 differ from the names used by the distributor 180, the distributor 180, in cooperation with the collector 170, can map and/or translate the names to ensure an appropriate match.

The distributor 180 processes the data request from the one or more users 110 to obtain the desired real-time, near real-time or historical data. In operation, the distributor 180 receives a request from the receiver 120, that is, for example, located at a call center supervisor workstation, and matches the information request with the available data known to the collector 170.

The premises telephone server 220 receives, with the cooperation of the automatic call distributor 230, one or more automatic call distribution events and forwards them to the statistics server 310 for statistics generation. For example, the statistics can include the current number of agents logged in, the current number of agents logged-in but not ready, the current number of agents on call, the current number of agents at work, or the like, as discussed above. Additionally, the statistics from the premises telephone server 220 can be forwarded and shared and made available to a plurality of collectors and wallboards via the premises statistics server 310.

The receiver 120, as discussed above, can be established as a client of the distributor 180 that initiates the request for the desired statistics and then receives the requested statistics at predetermined intervals. The raw statistics are then manipulated and provided to, for example, the wallboard server 240 for presentation on a wallboard 250. Since multiple wallboard vendors are available, obviously the receiver 120 can be configured for each type of wallboard server.

As an example, the wallboard 250 can be either an INOVA™ and/or Symon™ wallboard or comparable wallboard, that, in cooperation with the wallboard server 240, is capable of receiving data from one or more receivers and displaying this information to one or more users.

Figure 6:
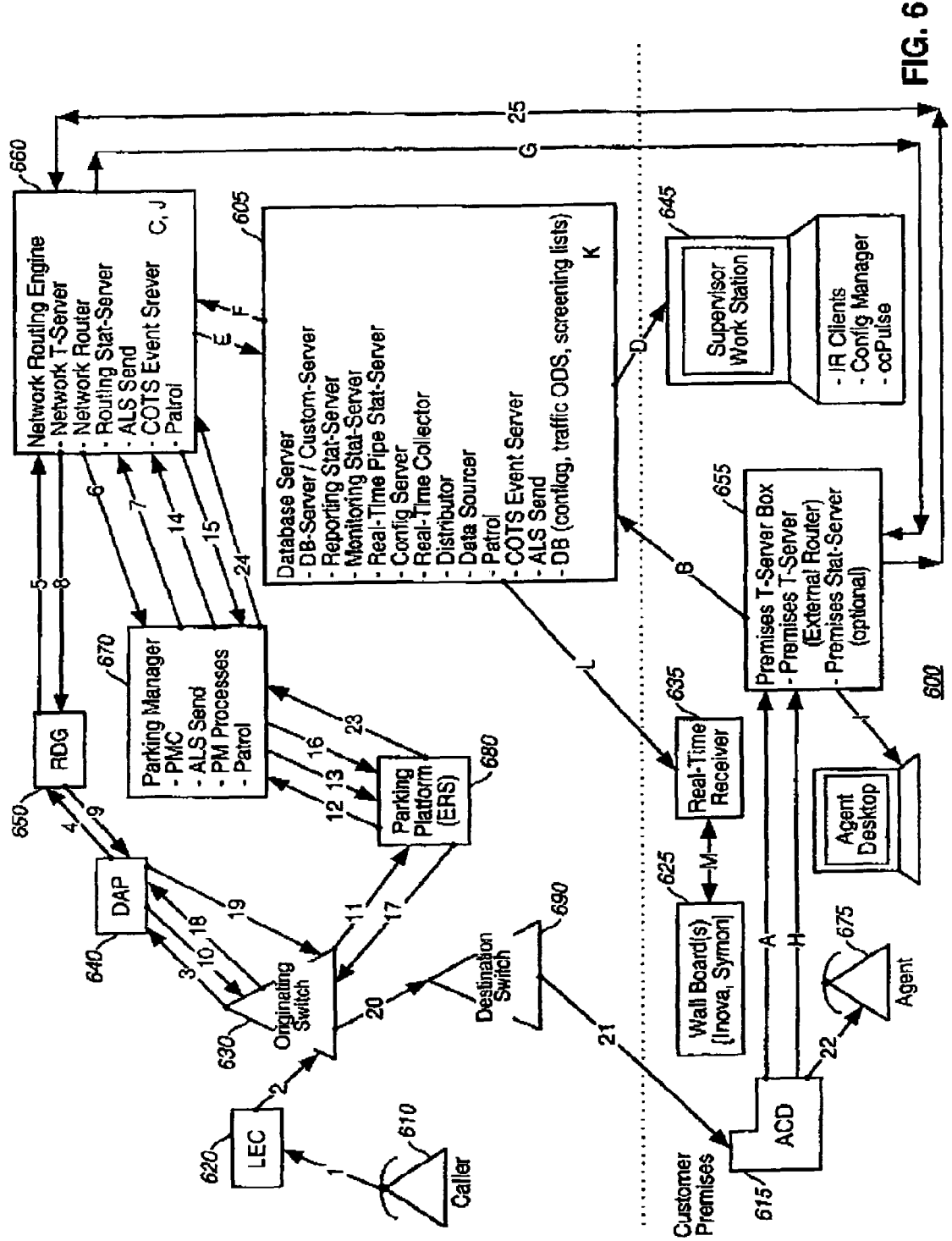
FIG. 6 is a data flow diagram illustrating an exemplary embodiment of the exchange of information between the telecommunication network and a user according to this invention.

FIG. 6 illustrates the call and data flow for obtaining real-time information about calls in an intelligent network services platform and a call center. In particular, the components in the intelligent network services platform and a call center 600 comprise a caller 610, a local exchange originating switch 630, a data access point 640, a remote data gateway 650, a network routing engine 660, a parking manager 670, a parking platform 680, a destination switch 690, a database server 605, an automatic call distributor (ACD) 615, one or more wallboard systems 625, a real-time receiver 635, a telephone server 655, one or more workstations 645, one or more desktops 665 and one or more agents 675.

In order to better understand the types of information that are available at different portions of a telecommunication network having a call management system, the operation and information transfer and location are hereinafter discussed. In particular, in step 1, caller 610 dials the local exchange carrier 620. The local exchange carrier can perform a database lookup, select a destination carrier and forward the call to the originating switch 630. Note that the originating and destination switches can be inter-exchange switches. Next, in step 2, the local exchange carrier forwards the call to the originating switch 630. The originating switch 630 analyzes the digits dialed by the caller 610 and queries the data access point 640 for routing instructions. Specifically, in step 3, the originating switch 630 queries the data access point 640 and receives additional routing information.

In step 4, the data access point 640 forwards the Intelligent Call Routing (ICR) generic request, such as that described in U.S. Pat. No. 5,917,900, to the remote data gateway 650 which converts the message format to external ICR or routing request. Additionally, the remote data gateway 650 uses a trigger point generated by the data access point 640 to identify the recipient routing engine, e.g., the originally dialed number. Next, in step 5, the routing request is forwarded to the appropriate network routing engine 660. The routing engine 660 selects a call routing by, for example, a corporate identification, the number dialed by the caller 610, and/or the telephone server, and determines an appropriate action. For example, if the routing engine 660 is unable to find an available target for the particular inbound call, the call routing can specify that the call is to be parked until an agent 675 becomes available. However, it is to be appreciated that the specific call routing can vary depending on the particular implementation and can have a number of different solutions for handling the incoming call from caller 610.

Next, in step 6, if the call is to be parked, the routing engine 660 forwards a parking request message to the parking manager 670. The parking manager 670 associates, for example, a unique dialed number identification service, which allows digits to be delivered to a call termination, identifying the number dialed by the calling party or where the call should be routed, and parks the call on a parking platform. This allows users to distinguish between call types on a specific trunk group. The parking manager 670 also checks for parking resource usage and, if locations are available, the parking manager 670 returns to the parking platform 680 destination information to the routing engine 660 to park the call. Specifically, in step 7, the parking manager 670 forwards parking platform destination information to the routing engine 660. The routing engine then continues the execution of the call routing process and returns the parking destination label and dialed number identification service information to the remote data gateway 650 as termination information.

In step 8, the routing engine 660 forwards the routing response, which can include, for example, a destination label, the dialed number identification service override, corporate identification, or the like, to the remote data gateway 650. The remote data gateway 650 translates the message back into an ICR or generic response message and forwards this to the data access point 640.

In step 9, as discussed above, the remote data gateway 650 forwards the ICR generic response to the data access point 640. The data access point 640 accepts the generic response from the remote data gateway and starts response handling by sending routing information to the originating switch 630. In step 10, routing information is received at the originating switch 630, which specifies that, for example, the call is to forwarded to in step 11, to the parking platform 680.

In step 12, a message indicating the parking platform 680 has received the call is forwarded to the parking manager 670. In particular, the parking platform 680 selects and plays the appropriate parking application, such as hold music, a prerecorded message, or the like, identified by the dialed number identification server and matches the automatic number identification and/or dynamic number identification service pair to the dialed number to send to the parking manager 670. The parking platform 680 also assigns a unique call ID for the parked call. Next, in step 13, the parking manager matches the parking platform call ID to the routing engine call ID for the parked call. The parking platform 680 then associates the appropriate destination label with a parking platform in case, for example, communications are lost before the call can be unparked through normal call processing.

In step 14, the parking manager 670 informs the network routing engine that the call was parked. The routing engine 660 then waits until an agent has become available via an agent ready indication from the statistics server which is housed by the routing engine 660 and continues with the call routing.

In step 15, the parking manager 670 accepts a transfer request message from the network routing engine 660 and translates the destination label provided by the routing engine 660 into a number that terminates at the selected routing engine target. Next, in step 16, the parking platform 680 prepares to transfer the call to the originating switch 630. Then, in step 17, the call is routed from the parking platform 680 to the originating switch 630.

In step 18, the data access point 640 retrieves the routing tree to translate the assigned number which is returned to the originating switch 630 in step 19. Then, in step 20, the originating switch 630 forwards the call to the destination switch 690.

In step 21, the destination switch 690 forwards the call to the automatic call distributor 615. In step 22, the automatic call distributor 615 queries the telephone servers 655 to obtain the attached user data including, for example, an agent ID and forwards the call to the appropriate agent 675. Then, in step 23, the parking platform 680, after sending the call back to the switch with the assigned numbered determination notifies the parking manager 670 that the call has been transferred to agent 675. Then, in step 24, the parking manager 670 notifies the routing engine 660 that the call was successfully completed. The routing engine can then close all outstanding logic for that call. Finally, in step 25, the telephone service 655 sends the routing engine 650 a notification of the termination success of the call having been terminated to agent 675.

In conjunction with the call flow outlined above, the data flow for the real-time data feed interface is completed as follows. In particular, in step A, the automatic call distributor 615 forwards information such as agents status, call receipt information, call states, phone states, route request and queue states, and the like. This information is thus available to an information requester on a real-time basis. The telephone service 655 reformats the automatic call distribution data into an automatic call distributor independent message. This information can then be passed to any registered client.

In step B, the telephone service 655, in cooperation with the database server 605 and the routing engine 660, collects and determines statistics for the registered clients. Next, in step C, the routing engine updates the internal cache which is used for one or more loaded call routing instructions.

In step D, the database server 605, that includes the monitoring statistics server, services the real-time supervisor monitoring program, such as ccPulse™, operating on the client supervisor workstation 645 by sending all statistics information that the real-time supervisor monitoring program is interested in to the real-time monitor graphing period. The real-time supervisor monitoring program can include insight into all the parking monitor points that are collected via the parking manager and telephone server interface.

In step E, the telephone server in the routing engine 660 passes the call response/event information to these statistics server including the parking information collected via the parking manager to telephone server interface. Next, in step F, the routing engine 660 is updated with the latest agent configuration information.

In step G, the interaction router, which is part of the routing engine 660, forwards attached user call data which can include, for example, target, extension, agent identification information, or the like, to the telephone server 655 and requests an external route point reservation. The telephone server 655 sends the external route point back to the routing engine 660 and the telephone server 655 stores the user call data in reserve as an external route point.

In step H, the automatic call distributor 615 receives a call on the reserved external route point, notifies the telephone server 655 and awaits the telephone server's response. Additionally, the telephone server 655 associates the user call data with the external route point, sends the agent target information to the automatic call distributor 615 for termination and prepares a transmission to the agent desktop 665.

In step I, the telephone server 655 provides the screen data to be displayed on the agent desktop 665. Then, in step J, the cache of the routing engine 660 is updated.

In step K, the real-time pipe statistics server, which is part of the database server 605, determines statistics in support of the real-time collector that has registered for a specific set of statistics. These statistics are sent to the distributor process for distribution to any connected real-time receivers. Next, in step L, the distributor sends the appropriate real-time statistics to all connected real-time receivers. The receivers format the statistics as necessary and perform any necessary calculations to support the users real-time data needs. Then, in step M, these statistics are forwarded to one or more wallboards 625.

Figure 7:
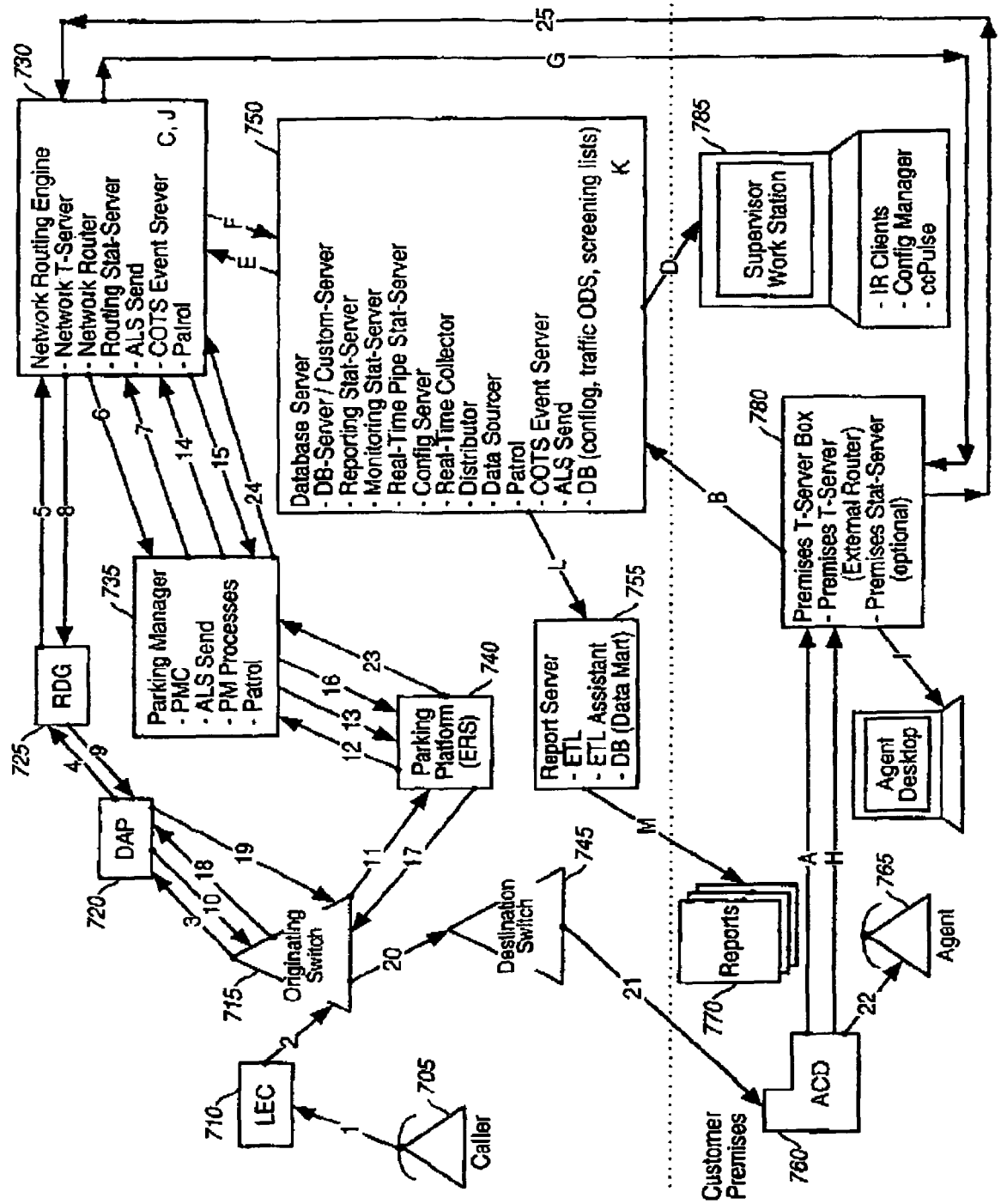
FIG. 7 is a data flow diagram illustrating a second exemplary embodiment of data flow between the telecommunication network and a user according to this invention.

FIG. 7 illustrates the call and data flow for obtaining historical information about calls in a an intelligent network services platform and a call center. In particular, the call and data is routed between a caller 705, a local exchange carrier 710, an originating switch 715, a data access point 720, a remote data gate 725, a routing engine 730, a parking manager 735, a parking platform 740, a destination switch 745, a database server 750, a report server 755, an automatic call distributor 760, one or more reports 770, one or more agent desktops 775, a telephone server 780 and one or more supervisor workstations 785.

In particular, calls are routed from a caller 705 to the local exchange carrier 710 in step 1. The local exchange carrier 710 performs a database lookup and selects an appropriate destination carrier based on this lookup and delivers the call, in step 2, to the selected switch. The originating switch 715 queries, in step 3, the data access point 720 for routing instructions. The data access point 720 retrieves the appropriate routing tree and encounters a trigger point. Then, in step 4, the data access point 720 forwards an ICR generic request to the remote data gateway 725.

The remote data gateway converts the message format to an external ICR routing request and appends check sum encrypted information using, for example, a DES algorithm. Additionally, the remote data gateway 725 uses the trigger point to identify the recipient routing engine. Then, in step 5, the remote data gateway 725 forwards the routing request to the routing engine 730. The routing engine 730 selects a call routing protocol as discussed above, and parks the call if the solution to the call routing solution is not available.

In step 6, assuming a strategy solution is not available, the routing engine 730 forwards a parking request message to the parking manager 735. The parking manger 735 associates a unique file number identification service that uniquely identifies the call on the parking platform 740. Additionally, the parking manager 735 queries the parking platform for parking resources usage. Assuming resources are available, the parking manager 735, in step 7, returns to the parking platform 740 destination information to the routing engine to park the call. In step 7, the routing engine continues the execution of the call routing and returns the parking label and file number identification service to the remote data gateway 725 as termination information in step 8.

In step 9, the remote data gateway 725 forwards to the data access point 720 the ICR generic response such that the data access point 720 can accept the generic response from the remote data gateway 725 and start response handling. Next, in step 10, the data access point 720 instructs the originating switch to route the call to the parking platform 740. In step 11, the destination switch terminates the call to the parking platform 740. Next, in step 12, the parking platform 740 selects and places the appropriate parking application identified by the dialed number identification service and matches the automatic number identification and/or dialed number identification service paired to the dialed number to send to the parking manger 735. The parking platform 740 also assigns a unique call ID to the parked call. Then, in step 13, the parking platform 740 forwards a call arrival message to the parking manager 735. The parking manager 735 matches the call ID to the routing engine call ID for the particular parked call. The parking manager 735 then provides the default destination level to the parking platform 740 in the event that communications are lost before the call can be unparked through the normal call processing processes.

In step 14, the parking manager forwards a call status response to the routing engine 730. The routing engine 730 identifies that an agent has become available via an agent ready indication from the statistics server and continues strategy execution. Next, step 15, the parking manager 735 accepts a transfer request message from the routing engine 730 and translates the destination level provided by the routing engine 730 into a number that terminates at the selected routing engine target. Then, in step 16, the parking platform receives the make call message from the parking manager 735 that is used by the interaction router to extend a call to the agent.

In particular, in step 17, the parking platform 740 outdials the call to the originating switch 715. Next, step 18, the originating switch 715 queries the data access point 720 to look-up a routing tree to translate the dialed number, which is translated and returned to the originating switch 715 in step 19.

In step 20, the originating switch 715 forwards the call to the destination switch 745. Next, in step 21, the destination switch forwards the call to the automatic call distributor 760. Then, in step 22, the call is terminated to the agent 765.

In step 23, the parking platform 740 notifies the parking manager 735 that the call has been transferred. Then, in step 24, a parking manager 735 notifies the routing engine 730 that the call attempt was routed and completed successfully and the routing engine can close the logic for the call. Then, in step 25, the telephone server 780 sends the routing engine 730 a notification of the termination success for the call.

Data flow for obtaining historical information about calls in the intelligent network services platform proceeds as follows. In particular, in step A, the automatic call distributor 760 sends to the telephone server 780 various information about the availability of one or more agents 765. The telephone server 780, in step B, reformats the automatic call distributor data which is then forwarded to the database server 750. In step C, the internal cache used in the loaded strategies is updated in the routing engine 730. Then, in step D, the database server, in cooperation with the statistics server, services the ccPulse client on the supervisor workstation 785 by sending all statistic information that ccPulse is interested in to support the real-time monitor graphing. ccPulse includes insight into all the parking monitor points that are collected via the parking manager to the telephone server.

In step E, the telephone server in the routing engine 730 passes the call response/event information to the statistics server. Then, in step F, the routing engine is updated with the latest agent configuration information. Then, in step G, the interaction router sends user call data to the external router located in the telephone server 780 and requests an external route point reservation. The external router sends the external route point back to the routing engine 730 and the telephone server 780 stores the user call data and reserves an external route point. Next, in step H, the automatic call distributor 760 receives a call on the reserved external route point, notifies the telephone server 780 and awaits the telephone server response. The telephone server associates the user call data with the external route point, sends the agent target information to the automatic call distributor 760 for termination, and prepares a transmission to the agent's desktop.

In step I, the telephone server 780 provides screen pop-data, such as a dialog box, to be displayed on the agent's desktop 765. Next, in step J, the internal cache of the routing engine 730 is updated. Then, in step K, the statistics server generates statistics in support of all historical traffic reporting data and sends information to the database server 750 that is responsible for population of an operational data store. This operational data store can, for example, archive statistics for long time storage that can be used, for example, for billing.

In step L, the report server 755 pulls the historical traffic reporting statistics and schedules a purge interval. Next, step M, the report 755 accesses the report server database 770 to produce the historical reports. The reports server 755 is also responsible for the delivery of reports to the call center.

Figure 8:
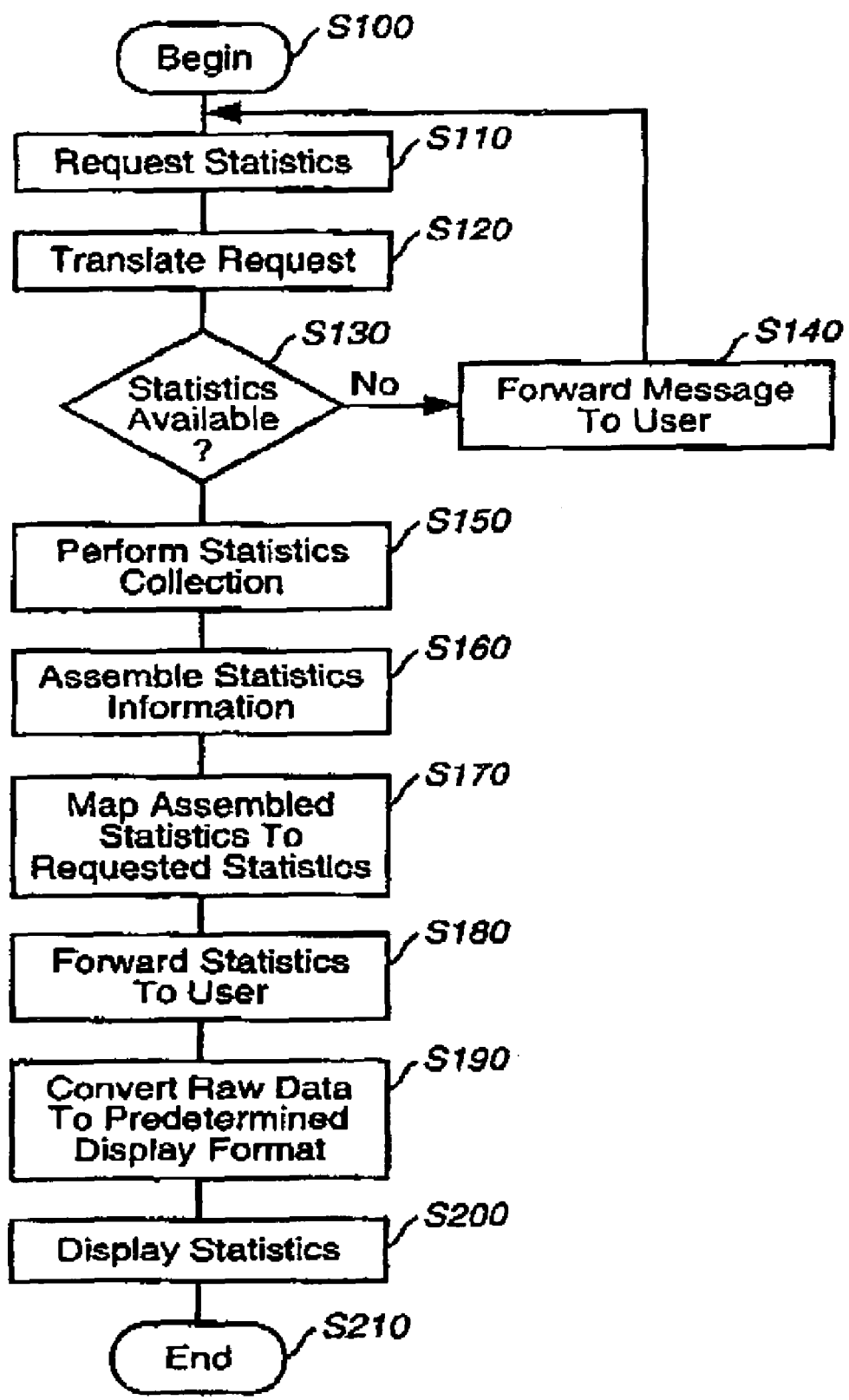
FIG. 8 is a flowchart illustrating an exemplary method of exchanging information according to this invention.

FIG. 8 outlines an exemplary method for obtaining information about calls within an intelligent network services platform according to an exemplary embodiment of this invention. In particular, control begins in step S100 and continues as step S110. In step S110, a statistics request is initiated/assembled. Next, step S120, the request is translated to align the request with the available statistics. For example, there can be a mapping between the statistics request and the statistics that are available in the instance where different names are used for the same statistic. Then, in step S130, a determination is made whether the requested statistics are available. If the requested statistics are available, control continues to step S150. Otherwise, control continues to step S140 where an optional message can be returned to the user indicating the statistics are not available.

In step S150, the collection of the requested statistic is performed. Next, step S160, the statistical information is assembled. Then, in step S170, the assembled statistics are remapped to match the original statistics request. Control then continues to step S180.

In step S180, the statistics are returned to the requester. Next, step S190, the raw statistics are converted to a predetermined display format. Then, in step S200, the statistics are displayed. Control then continues to step S210 wherein the control sequence ends.

As illustrated in the figures, the telecommunications network can be implemented either on a single programmed general purpose computer, a separate programmed general purpose computer, or a combination thereof. However, the telecommunications network can also be implemented on a special purpose computer, a programmed microprocessor or microcontroller and peripheral integrated circuit elements, an ASIC, or other integrated circuit, a digital signal processor, a hardwired electronic or logic circuit such as a discrete element circuit, a programmable logic device such as a PLD, PLA, FPGA, PAL, or the like. In general, any device capable of implementing a state machine that is in turn capable of implementing the flowchart illustrated in FIG. 8 can be used to implement the telecommunications network according to this invention.

Furthermore, the disclosed method may be readily implemented in software using an object or object-oriented software development environment that provides source code that can be use on a variety of computer, server or workstation hardware platforms. Alternatively, the disclosed telecommunications network may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The telecommunications networks and methods illustrated herein however, can be readily implemented in hardware and/or software using any know or later developed systems or structures, devices and/or software by those of ordinary skill in the applicable art from the functional description provided herein and with a general basic knowledge of the computer and telecommunications arts.

Moreover, the disclosed methods may be readily implemented as software executed on a programmed general purpose computer, a special purpose computer, a microprocessor, or the like. In these instances, the methods and systems of this invention can be implemented as a program embedded on a telecommunications management system, such as in a JAVA® or CGI script, as a resource residing on a server or graphics workstation, as a routine embedded in a dedicated telecommunications network, a web browser, or the like. The telecommunications network can also be implemented by physically incorporating the system into a software and/or hardware system such as the hardware and software systems of a server and associated telecommunications management/switching device(s).

It is, therefore, apparent that there has been provided, in accordance with the present invention, systems and methods for exchanging information. While this invention has been described in conjunction with a number of embodiments, it is evident that many alternatives, modifications, and variations would be or are apparent to those of ordinary skill in the applicable arts. Accordingly, the disclosure is intended to embrace all such alternatives, modifications, equivalents and variations that are within the spirit and scope of this invention.

what is claimed is:

1. A method, comprising;
    collecting data associated with a plurality of call centers;
    generating information associated with at least one of calls that have been forwarded or calls that are to be forwarded to the plurality of call centers based on the collected data; and
    forwarding at least a portion of the generated information to a first one of the plurality of call centers.

2. The method of claim 1, wherein the forwarding at least a portion of the generated information comprises:
    forwarding information associated with calls that have been processed by the plurality of calls centers and information associated with calls that are currently being processed by the plurality of call centers.

3. The method of claim 1, wherein the forwarding at least a portion of the generated information comprises:
    forwarding information identifying a number of calls waiting to be forwarded to the plurality of call centers.

4. The method of claim 1, wherein the forwarding at least a portion of the generated information comprises:
    forwarding information identifying a number of hang ups that occur over a period of time.

5. The method of claim 1, wherein the forwarding at least a portion of the generated information comprises:
    forwarding information associated with a distribution time for a call.

6. The method of claim 1, further comprising:
    determining a percentage of calls that were answered; and
    forwarding information identifying the percentage to the first call center.

7. The method of claim 1, further comprising:
    determining agent availability at the plurality of call centers; and
    forwarding results of the determining to the first call center.

8. A method for obtaining information associated with a plurality of call centers, comprising:
    receiving, by a first device associated with a first one of the plurality of call centers, information associated with the plurality of call centers, the information comprising at least one of historical information associated with calls that have been processed by the plurality of call centers or information associated with calls that are currently being processed by the plurality of call centers; and
    displaying at least a portion of the received information.

9. The method of claim 8, wherein the received information comprises information identifying a number of calls waiting to be forwarded to the plurality of call centers.

10. The method of claim 8, wherein the received information comprises information identifying a number of hang ups that occur over a period of time.

11. The method of claim 8, wherein the received information comprises information corresponding to a distribution time for a call.

12. The method of claim 8, wherein the received information comprises information identifying a percentage of received calls that were answered.

13. The method of claim 8, wherein the received information comprises agent availability information at the plurality of call centers.

14. The method of claim 13, wherein the agent availability information comprises at least one of a number of agents logged in to take calls at the plurality of call centers or a number of agents not logged in to take calls at the plurality of call centers.

15. The method of claim 8, further comprising:
    receiving, by the first device, the information at predetermined intervals; and
    displaying, by the first device, at least a portion of the received information at the predetermined intervals.

16. The method of claim 8, wherein the received information comprises historical information associated with calls that have been processed by the plurality of call centers and information associated with calls that are currently being processed by the plurality of call centers.

17. A system for monitoring a plurality of call centers, comprising;
    means for collecting data associated with the plurality of call centers;
    means for generating information associated with at least one of calls that have been forwarded or calls that are to be forwarded to the plurality of call centers based on the collected data; and
    means for forwarding at least some of the generated information to a first one of the plurality of call centers.

18. The system of claim 17, wherein the at least some of the generated information comprises information identifying a number of calls waiting to be forwarded to the plurality of call centers.

19. The system of claim 17, wherein the at least some of the generated information comprises information identifying a number of hang ups that occur over a period of time.

20. The system of claim 17, wherein the at least some of the generated information comprises information associated with a distribution time for a call.

21. The system of claim 17, further comprising:
means for determining a percentage of calls that were answered; and
means for forwarding information identifying the percentage to the first call center.

22. The system of claim 17, further comprising:
means for generating historical information associated with calls that have been processed by the plurality of call centers; and
means for forwarding the historical information to the first call center.

23. A system, comprising:
a first device configured to:
collect data associated with a plurality of call centers,
generate information associated with at least one of calls that have been forwarded or calls that are to be forwarded to the plurality of call centers, and
forward at least a portion of the generated information to a first one of the plurality of call centers.

24. The system of claim 23, wherein the at least a portion of the generated information comprises a number of calls in a parked state.

25. The system of claim 23, where the at least a portion of the generated information comprises a number of calls that were answered over a period of time versus a number of calls that were received over the period of time.

26. The system of claim 23, where the at least a portion of the generated information comprises at least one of a number of calls answered within an expected answer time or a percentage of calls answered within the expected answer time.

27. The system of claim 23, wherein the at least a portion of the generated information comprises a number of hang ups that occur over a period of time.

28. The system of claim 23, wherein the at least a portion of the generated information comprises information associated with a distribution time for a call.

* * * * *